United States Patent Office 2,752,638
Patented July 3, 1956

2,752,638

PROCESS OF POLYMERIZING α-CHLOROACRYLIC ACID ESTERS IN CONTACT WITH A VITREOUS SURFACE AND IN THE PRESENCE OF AN OILY SILOXANE POLYMER

Harry D. Anspon, Easton, Pa., assignor to General Aniline & Film Corporation, New York, N. Y., a corporation of Delaware No Drawing. Application December 30, 1950, Serial No. 203,785

6 Claims. (Cl. 18—58)

This invention relates to an improvement in the casting of polymers of α-chloroacrylic acid esters by mass polymerization of the corresponding monomer in a mold comprising a rigid mold surface of glass or similar vitreous ceramic material, and to the polymerizable compositions employed in said process.

In the mass polymerization of esters of α-chloroacrylic acid, e. g. methyl α-chloroacrylate, in glass or similar vitreous ceramic molds, adhesion of the polymer to the vitreous surface of the mold presents a serious problem. Substantial shrinkage in volume occurs during polymerization of monomeric α-chloroacrylic acid esters (e. g. about 23% shrinkage in the case of methyl α-chloroacrylate). When a glass mold is employed for casting polymers of the aforesaid monomers, e. g. in casting polymer sheets or rods, the polymer produced tends to adhere so firmly to the glass portions of the mold that shrinkage of the mold contents during polymerization or on cooling causes fracture of the mold or the polymer, or both. Adhesion is so pronounced in the case of methyl α-chloroacrylate that glass fragments are often torn from a glass mold surface by the polymer.

Incorporation of alcohols such as methanol or ethanol in minor amounts in the monomer as described in U. S. patent application Serial No. 601,342, filed June 23, 1945, now Patent No. 2,548,091 for rendering color-generating impurities innocuous in the ester monomer, is also effective to facilitate separation of the polymer from glass molds, but only when the alcohol is present in such amounts as to reduce the softening point of the polymer by about 10° C. or more, as compared with a polymer produced in the absence of the added alcohol. When a relatively pure ester monomer is employed, containing no added color-inhibiting reagent of the type disclosed in the aforesaid patent application, a polymer of increased hardness and heat resistance is produced, but the polymer adheres firmly to the glass portions of the mold, causing fracture of the mold or the polymer.

I have discovered that the aforesaid adhesion of mass polymers of α-chloroacrylic acid esters can be avoided by incorporating in the monomer, prior to polymerization, a small amount, e. g. 0.005 to 0.1% of the weight of the monomer of an oily silicone resin, i. e., a hydrocarbon siloxane polymer produced by hydrolysis and polymerization of dichloro- or dialkoxy-dihydrocarbon silane and consisting essentially of recurrent structure units having the formula

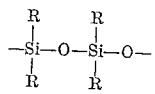

wherein R represents similar or dissimilar hydrocarbon radicals such as methyl, ethyl, phenyl or benzyl radicals. For example, a silicone oil (Dow Corning Type DC-550), in which about half of the R's in the foregoing unit formula are methyl groups and the other half are phenyl groups, has been found especially suitable for the purposes of this invention.

Not only does a trace of the oily silicone resin obviate adhesion of the α-chloroacrylic ester polymer to glass mold surfaces, but in the aforesaid concentrations, it remains fully compatible with the polymer, causing no decrease in optical transparency, no appreciable decrease in softening point or hardness of the polymer, and has no adverse effect on the polymerization of the monomer or the ageing properties of the polymer.

The improved casting method of my invention, and the compositions employed and produced therein are illustrated by the following example, wherein parts and percentages are by weight.

Example

To a quantity of liquid monomeric methyl α-chloroacrylate, purified by fractional distillation under reduced pressure and maintained thereafter in an oxygen-free atmosphere to prevent formation of autooxidation products, there was added a quantity of silicone oil (Dow Corning Type DC-550), i. e., an oily siloxane polymer containing a substantially equal number of methyl, phenyl, and SiO radicals, in an amount corresponding to 0.02% of the amount of methyl α-chloroacrylate. At the same time, a quantity of ditertiary butyl peroxide was added to serve as a polymerization catalyst amounting to 0.06% of the methyl α-chloroacrylate. The monomer containing the aforesaid adjuvants was transferred to a mold consisting of a pair of plate glass sheets of similar size and shape, held in spaced parallel face-to-face relation (about 5/16 inch apart) with their edges in mutual alignment and joined by a yieldable edge closure enclosing the space between the plates except for a filler opening. When the mold was filled with the monomer, the filler opening was sealed and the mold and its contents heated at about 60° C. for 72 hours, and then at about 120° C. for 24 hours to complete polymerization. On cooling, the glass plates were readily separated from the polymer sheet contained between them, without breakage or marring of the mold plates or of the polymer sheet. The sheet obtained had the same softening point as one similarly produced but without addition of silicone oil, and was colorless and completely transparent. On protracted exposure to ultraviolet light under atmospheric conditions, no discoloration or other deterioration of the polymer plate was observed.

On the other hand, when methyl α-chloroacrylate, similarly purified, was polymerized in a glass tube or in a mold similar to that employed in the example, by ultraviolet light without addition of the silicone oil, the tube and the mold plates cracked after the polymerization proceeded beyond the stage at which the contents were still fluid.

Other esters of α-chloroacrylic acid, for example, alkyl esters such as ethyl, propyl, isopropyl, butyl, amyl, isoamyl, hexyl, octyl or lauryl esters; alkenyl esters such as allyl, methallyl or crotyl esters; polyhydric alcohol esters such as the ethylene glycol or 1,4-butanediol esters; cycloalkyl esters such as cyclohexyl or methyl-cyclohexyl esters; aralkyl esters such as the benzyl ester; aryl esters such as phenyl or tolyl esters, and heterocyclic esters such as the tetrahydrofurfuryl ester, can be similarly modified by incorporation of oily siloxane polymer as illustrated in the example, to prevent adhesion of the polymer to the glass mold. The concentration of the oily siloxane polymer can vary from 0.005 to 0.1% of the α-chloroacrylic acid ester monomer.

Oily siloxane polymers have been suggested heretofore for mold coating agents in the molding of plastics under heat and pressure, but it was not known heretofore that their inclusion in monomeric α-chloroacrylic acid esters in the trace amounts employed in accordance with this invention would prevent adhesion of a mass polymer to the glass portions of a mold employed in the casting thereof.

Variations and modifications which will be obvious to those skilled in the art can be made in the procedure and compositions of this invention without departing from the scope or spirit thereof.

I claim:

1. In a process involving mass polymerization of an α-chloroacrylic acid ester of an alcohol containing no functional substituent groups other than alcoholic hydroxyl groups in contact with a vitreous mold surface, the improvement which comprises incorporating in said ester from 0.005 to 0.1% of its weight of an oily hydrocarbon siloxane polymer in which the hydrocarbon radicals contain up to 7 carbon atoms, and polymerizing the ester containing said siloxane polymer in contact with said mold surface.

2. In a process involving mass polymerization of methyl α-chloroacrylate in contact with a vitreous mold surface, the improvement which comprises incorporating in the methyl α-chloroacrylate from 0.005 to 0.1% of its weight of an oily hydrocarbon siloxane polymer in which the hydrocarbon radicals contain up to 7 carbon atoms, and polymerizing the composition in contact with said mold surface.

3. In a process for casting sheets of polymeric methyl α-chloroacrylate by mass polymerization of a layer of methyl α-chloroacrylate between and in contact with a pair of spaced glass plates, the improvement which comprises incorporating in the monomer, prior to polymerization thereof, from 0.005 to 0.1% of its weight of an oily methyl phenyl siloxane polymer containing substantially an equal number of methyl, phenyl, and SiO groups.

4. A composition of matter essentially consisting of a solution, in a polymerizable α-chloroacrylic acid ester of an alcohol containing no functional substituent groups other than alcoholic hydroxyl groups, of an oily hydrocarbon siloxane polymer in which the hydrocarbon radicals contain up to 7 carbon atoms amounting to 0.005 to 0.1% of the weight of said ester.

5. A composition of matter essentially consisting of a solution, in monomeric methyl α-chloroacrylate, of an oily hydrocarbon siloxane polymer in which the hydrocarbon radicals contain up to 7 carbon atoms amounting to 0.005 to 0.1% of the weight of said methyl α-chloroacrylate.

6. A composition of matter essentially consisting of a solution, in monomeric methyl α-chloroacrylate, of an oily methyl phenyl siloxane polymer containing substantially an equal number of methyl, phenyl, and SiO groups, and amounting to 0.005 to 0.1% of the weight of said methyl α-chloroacrylate.

References Cited in the file of this patent

UNITED STATES PATENTS

| | | |
|---|---|---|
| 2,470,772 | Haas | May 24, 1949 |
| 2,475,194 | Nyquist et al. | July 5, 1949 |
| 2,558,584 | Safford | June 26, 1951 |